United States Patent [19]

Fritzel

[11] Patent Number: 5,339,188
[45] Date of Patent: Aug. 16, 1994

[54] STEP STARE SCANNING APPARATUS AND METHOD

[75] Inventor: Bradley G. Fritzel, Hermosa Beach, Calif.

[73] Assignee: Hughes Aircraft Company, Los Angeles, Calif.

[21] Appl. No.: 945,779

[22] Filed: Sep. 16, 1992

[51] Int. Cl.⁵ .......................................... G02B 26/08
[52] U.S. Cl. .................................. 359/200; 359/216; 250/236; 464/180
[58] Field of Search ............... 359/196, 197, 212, 216, 359/223, 225, 226, 200, 198, 217–219, 900; 250/234–236; 464/170, 179, 180

[56] References Cited

U.S. PATENT DOCUMENTS 4,246,612 1/1981 Berry et al. ........................ 359/218

Primary Examiner—Loha Ben
Assistant Examiner—James Phan
Attorney, Agent, or Firm—Michael W. Sales; Wanda K. Denson-Low

[57] ABSTRACT

A step stare scanning device includes a mirror with a plurality of facets mounted to a mechanism which substantially simultaneously rotates the mirror about a first axis while orbiting the mirror about a second axis. The rotating and orbiting motion creates a step stare scanning pattern from a constant rotary input. The field of view of an associated detector array is increased while minimizing detrimental effects of known stop-start mechanisms.

23 Claims, 3 Drawing Sheets

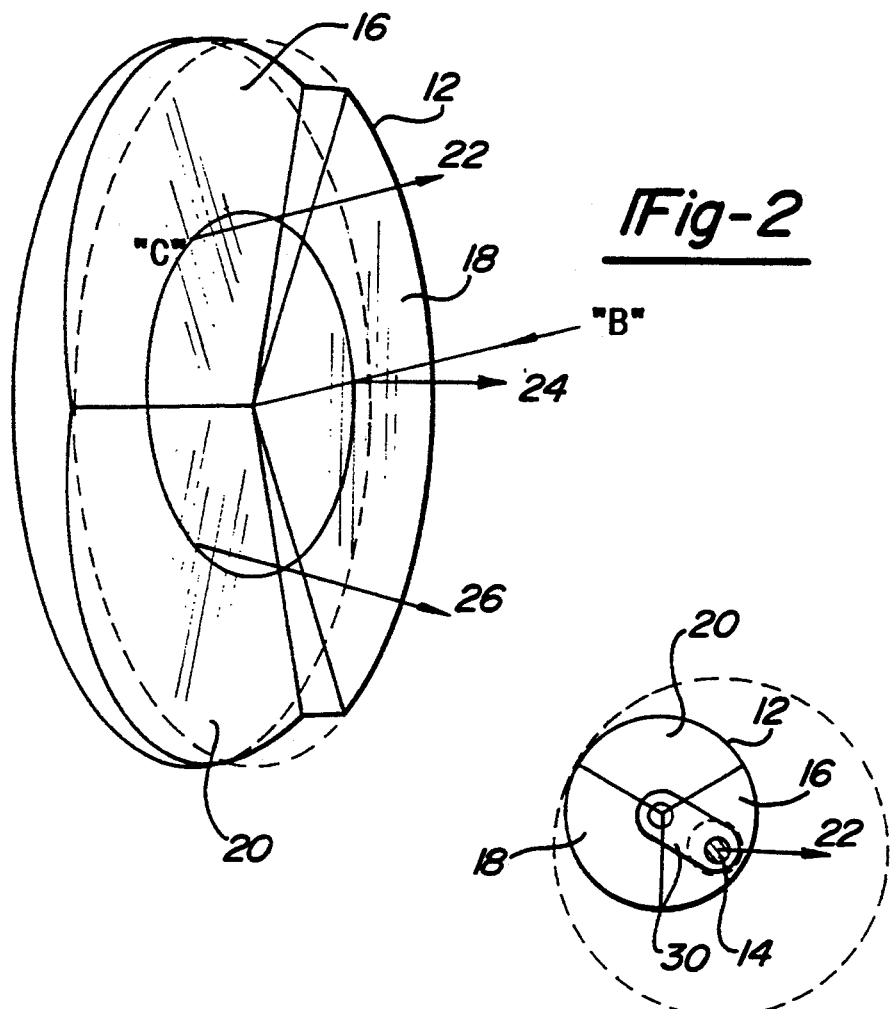
*Fig-2*
*Fig-3A*
*Fig-3C*
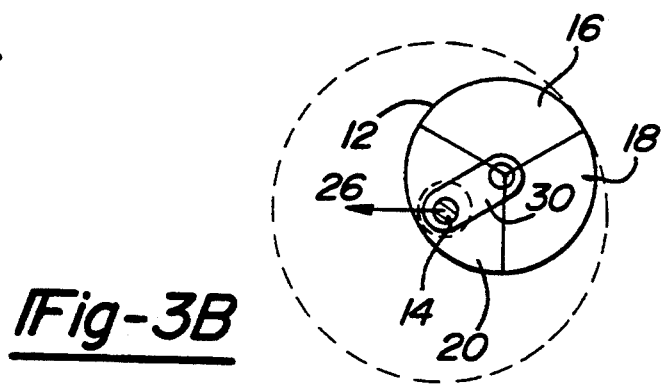
*Fig-3B*

STEP STARE SCANNING APPARATUS AND METHOD

BACKGROUND OF THE INVENTION

The present invention relates generally to optical scanning or detecting devices and, more particularly, to a scanning device capable of step stare scanning to thereby enhance the field of view of a stare scanning array.

Optical scanning devices have long been used in tracking and sensing systems such as in aircraft forward looking infra-red radar (FLIR) systems. In a typical optomechanical scanner, a rotating scanning mirror is generally used to create a linear scanning pattern over a target. Coupled with the forward motion of an aircraft, for example, the linear scanning pattern generated by the rotating scanning mirror is converted into a saw-tooth or triangular scanning pattern and an area can be effectively scanned. Scanning is further accomplished in passive and active modes. In a passive mode, the scanning device simply "looks" at a target area and receives signals emanating from the scan target and reflects them to a detector, such as in a system set up to scan infra-red radiation emanating from the target. In an active scanning mode, the scanning device also includes a signal source, such as a laser, which sends out a signal. The scanning device receives a portion of the signal which is reflected back from the target at the detector. Information derived from the signal reflected back to the scanner allows for the determination of a number of pieces of information such as the distance of the object from the scanner or the general shape of the object. Often the scanning application requires an area to be scanned very quickly. While there is generally no problem with having the mechanical elements of the scanner operate at higher frequencies, scanning devices are often limited by the rate at which the detector elements can receive information.

Stare scanning devices, i.e., devices having multiple detector elements assembled into an array, allow for greater reception of information and thus increase the speed of the scanning system. In such devices, the array of elements simultaneously receive information from an area within its field of view in what is known as electronic scanning. These devices are also capable of operating in passive or active scanning modes. The disadvantage of stare scanning arrays is that they have a limited field of view generally defined by the number of detectors in the array. An illustrative example of this narrow field of view is the relatively limited image viewed through the lens of a camera versus the image viewed by the human eye. Thus there is a need for enhancing the field of view of stare scanning arrays.

One method of enhancing the field of view of stare scanning devices is to simply construct larger scanning arrays. Unfortunately, the large number of detector elements required to significantly enlarge the field of view increase the size, weight, cost and technical complexity of the scanning device. A second method is to create a mechanical apparatus which moves or scans the stare scanning array at different view angles. The apparatus moves the array to a viewing angle, allows the scanner to scan at that viewing angle for a period of time, moves the array to new viewing angle and so on. The start-stop motion created by moving the scanner to different viewing angles, however, creates mechanism accelerations, requires large amounts of power, and imparts forces on the mounting system thus requiring sturdier, and necessarily heavier mounting structures. All of these characteristics are undesirable particularly if the scanning apparatus is to be used in aircraft or spacecraft applications.

Another method of enhancing the field of view of stare scanning arrays is to create a scanning device that will scan at a number of different viewing angles and reflect the signals received from a particular viewing angle to a single stare scanning array. Such an arrangement advantageously combines the increased field of view available with optomechanical scanning devices with the speed of electronic scanning with a stare scanning array. Prior devices have used oscillating mirrors or vertically and horizontally rotating prisms to hold or "stare" while scanning at a particular viewing angle and then move or "step" to a new viewing angle, scanning at this new viewing angle and so on. While these systems are adequate for providing the appropriate step stare scanning pattern, they also suffer the disadvantages associated with causing the scanning apparatus to make start-stop motions necessary to adjust the mirror or prism from one viewing angle to another viewing angle. Therefore, it would be desirable to create the step stare scanning pattern with a constant motion.

SUMMARY OF THE INVENTION

In accordance with the teachings of the present invention, a step stare scanning device is provided with a reflector that has a plurality of reflecting surfaces. Each reflector surface is angled with respect to the other surfaces. Provision is made for rotating the reflector about a first axis while substantially simultaneously orbiting the reflector about a second axis, which is preferably associated with an array of detector elements.

In such manner, the field of view of the stare scanning array is enhanced while eliminating the stop-start motions and the concomitant problems associated with known techniques.

BRIEF DESCRIPTION OF THE DRAWINGS

Other advantages, features and benefits of the present invention will become apparent to those skilled in the art from the following written description, claims, and drawings in which:

FIG. 2 is a perspective view of the mirror of the scanning device of the present invention further illustrating the reflective surfaces;

FIGS. 3A, 3B, and 3C are views illustrating the combined rotating and orbiting motion of the scanning device;

DETAILED DESCRIPTION OF THE INVENTION

Figure 1:
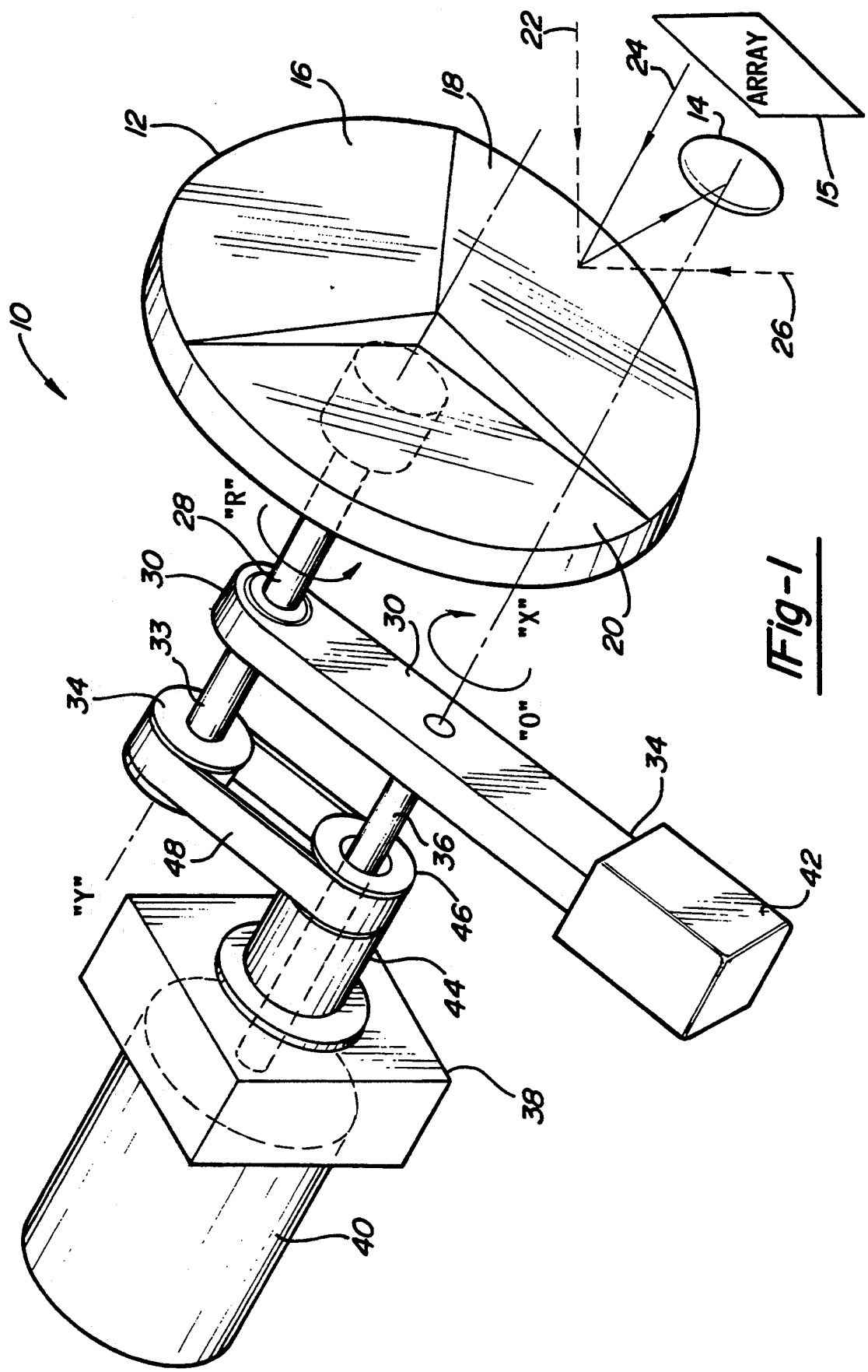
FIG. 1 is a perspective view of one embodiment of the step stare scanning device of the present invention.

The step stare scanning device 10, as shown in FIG. 1, of the present invention creates a step stare scanning pattern through the combined rotating and orbiting motion of a multi-faceted mirror 12 about a scanning pupil 14. This combined rotating and orbiting motion operates to maintain the scanning pupil 14 of scanning device 10 in a fixed angular relation with a scanned line of sight as the mirror rotates and orbits a facet across the scanning pupil. New angular relationships are established between the pupil and a new scanned line of sight for each facet rotated in front of the scanning pupil. An array of detector elements or stare scanning array 15 is positioned at the scanning pupil thereby receiving input signals from the targets scanned. It should be understood that the stare scanning array is selected based upon the particular scanning requirements, but the array would generally consist of one or more solid state charge coupled devices (CCD) designed to receive optical input at a desired wavelength and produce an electrical output signal in response thereto. The step stare scanning procedure is repeated for each of the facets on mirror 12 and then begins again thereby providing an enlarged field of view for the single stare scanning array.

With additional reference to FIG. 2, multi-faceted mirror 12 is shown in the present embodiment having three facets 16, 18, and 20 respectively. It should be understood, however, that mirror 12 may have a number of facets of two or more. Facets 16, 18, and 20 are orientated at differing angles with respect to each other establishing viewing angles as indicated by arrows 22, 24 and 26 (arrows 22 and 26 shown in phantom in FIG. 1). Therefore, through the addition of facets and changing of the angular orientation of the facets a wide variety of viewing angles may be established.

With continued reference to FIG. 2, if a collimated beam of light as indicated by arrow "B" were made to translate at a fixed angle in space around a circle on mirror 12, generally indicated at "C", the reflected beam, in addition to translating along a scan line of sight in space, would also change angular orientation as it crossed between facets. During the time the beam translated across the surface of a given facet, for example facet 18, the beam would reflect at a constant angle corresponding to the viewing angle of facet 18 as indicated by arrow 24. As the beam crosses from one facet to the next, however, an abrupt angular change in its reflected direction would occur and the beam would reflect at a new angle corresponding to a new viewing angle such as indicated by arrows 22 and 26 for facets 16 and 20, respectively. In this respect, the beam can be said to "stare" at a given viewing angle as it translates across a facet and "step" to a new viewing as it crosses facets. In practical optical systems, the starring detector, or signal source in an active scanning system, must be positioned at the pupil of the scanning system and generally maintained in a stationary position with respect to the optical axis of the scanning system. In order to create the step stare scanning pattern described above, the mirror or reflector must be manipulated to create the apparent motion of the pupil orbiting about the mirror.

With reference then to FIG. 1, mirror 12 is shown mounted to shaft 28 with the plane of mirror perpendicular to the axis of shaft 28 and fixed for rotary motion therewith. Shaft 28 is journaled through arm member 30, and has fixed at a second end 33 a pulley 34 for transmitting rotary motion thereto. Arm 30 is mounted near its center to shaft 36 with a suitable spline or keyed interconnection such that arm 30 is caused to rotate concomitantly with shaft 36. Shaft 36 extends through and is suitably journaled for rotary motion within a housing 38 and is directly coupled to receive driving rotary input from motor 40. Mounted at a second end of arm 30 is a mass 42 providing counter weight mass balance to apparatus 10.

Housing 38 is shown in FIG. 1 generically as a box. It will be appreciated that, in practice, housing 38 is suitable configured for mounting scanning device 10 within a vehicle, for example, an aircraft or spacecraft. Fixed to housing 38 and extending outwardly therefrom is boss formation 44 having formed integral therewith second pulley 46. Motor 40 is fixed to housing 38 providing driving input to shaft 36. Belt 48 connects pulley 34 with pulley 46 thereby causing counter rotation of shaft 26 in response to rotation of arm 30.

With continued reference to FIG. 1 and further reference to FIGS. 3A, 3B, and 3C the operation of the step stare scanning device will be explained. FIG. 3A shows the scanning device in a first position and scanning in a first direction as indicated by arrow 22. Thus images to the right of the scanning device as shown in FIG. 3A are reflected to the scanning pupil 14 and likewise to the staring array 15 positioned at scanning pupil 14. Rotary input from motor 40 causes arm 30 to rotate in a clockwise fashion about axis "X" as indicated by arrow "0" thus causing mirror 12 to move in an orbiting motion about scanning pupil 14. Substantially simultaneously with the orbiting motion of mirror 12, engagement of belt 48 with pulleys 34 and 46 further cause mirror 12 to rotate about axis "Y" in a counterclockwise fashion as indicated by arrow "R". Thus when arm 30 is rotated to the position indicated in FIG. 3B, mirror 12 has orbited and rotated such that facet 20 is now in line with scanning pupil 14 and images to the left of scanning device 10 as shown in FIG. 3B are viewed as indicated by arrow 26. Similarly, as arm 30 further rotates to the position indicated in FIG. 3C, mirror 12 orbits and rotates such that facet 18 is now in line with scanning pupil 14 and images directly in line with scanning device 10 as shown in FIG. 3C are viewed.

According to the teaching of the present invention, scanning device 10 is activated by energizing motor 40 at a constant rotational velocity, thereby orbiting and rotating mirror 12 about scanning pupil 14. Once activated, scanning device 10 will step stare scan without start-stop motions and, therefore, without associated mechanism accelerations. In the preferred embodiment, pulleys 34 and 46 have approximately the same diameter thus rotating mirror 12 at substantially the same angular velocity as it is orbited. This provides for scanning at a number of viewing angles corresponding to the number of facets in mirror 12 for each orbit. The diameters of pulleys 34 and 46 may be changed to provide differing angular velocities of rotation and orbit depending on the scanning application.

Figure 5:
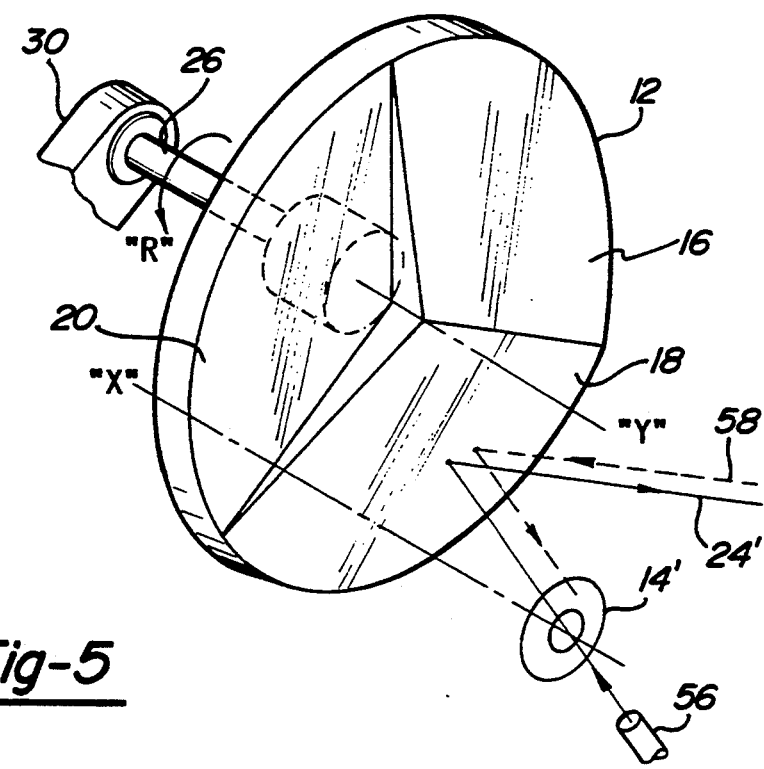
FIG. 5 is a view of a portion of FIG. 1 showing the scanning device of the present invention incorporating a signal source.

In another embodiment of the present invention, a signal source 56 (FIG. 5), such as a laser, may be added to scanning device 10 for scanning in an active mode. In describing this and other embodiments, primed reference numerals are used to describe like elements of the prior embodiment. Signal source 56 is positioned at scanning pupil 14' and directed at mirror 12. As mirror 12 orbits and rotates with respect to scanning pupil 14', the light beam is caused to scan at fixed angles corresponding to facets 16, 18 and 20 of mirror 12 and shown, for example, by arrow 24' for facet 18. If signal source 56 is combined with a stare scanning array or other detector element (not shown) also located at scanning pupil 14', the portion of the source signal reflected back from the scanned target along the viewing angle, shown by phantom arrow 58, can be received thereby providing active scanning.

Figure 4:
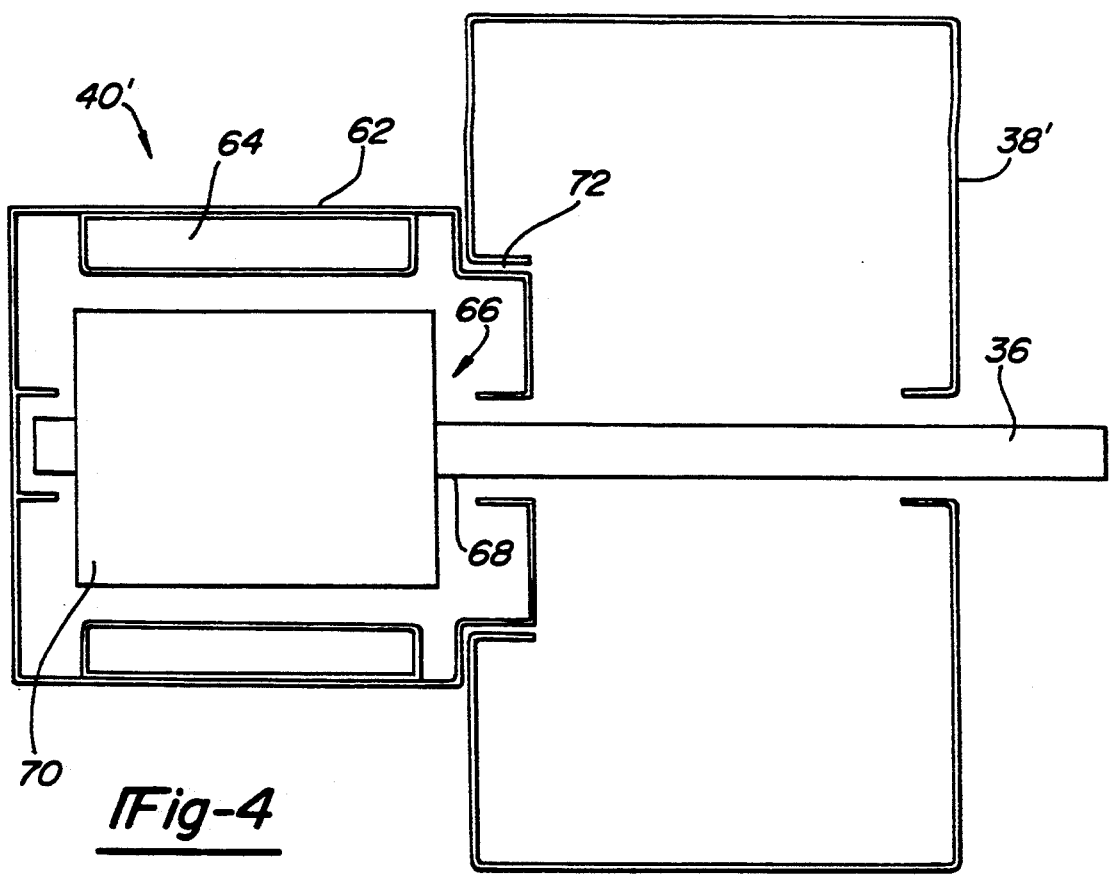
FIG. 4 is a schematic illustration of an additional embodiment of the present invention wherein the drive motor is journaled to the scanner housing.

The scanning device can be further made reactionless, i.e., such that motor torques or gyroscopic torques of the scanning mechanism are not reacted through housing 38 and thus imparted upon the vehicle carrying the apparatus. As seen schematically in FIG. 4, motor 40' includes a motor housing 62 into which a first set of stator or field windings 64 are secured, and a rotor or armature 66 comprising a shaft 68 and windings 70 journaled within motor housing 62. It will be appreciated, that depending on the application in which scanning device 10 is used and the energy source available, motor 40' may be either a direct current or alternating current motor. Motor housing 62 is further journaled to housing 38' by suitable bearings indicated at 72. Thus when scanning device 10 is activated, motor housing 62 will rotate counter to the direction of orbit of mirror 12 thus eliminating torque transfer to housing 38'. This arrangement is particularly advantageous in spacecraft applications where force transfer to the vehicle is undesirable or where housing 38' must be light weight and therefore having reduced structural capability.

While several embodiments have been described to illustrate the principles of the present invention, it will be understood that the invention may be embodied otherwise without departing from such principles. For example, one skilled in the art will readily recognize from such disclosure and from the accompanying drawings and claims that various changes, modifications, and variations can be made therein without departing from the spirit and scope of the invention as defined in the following claims.

We claim:

1. A step stare scanning device, comprising:
   a scanning pupil;
   a reflector having a plurality of reflecting surfaces, each surface being angled with respect to each other; and
   moving means for causing said reflector to rotate in a first angular direction about a first axis and substantially simultaneously orbit in a second axis so that signals received at said reflecting surfaces are relfected to said scanning pupil.

2. The step stare scanning device of claim 1 wherein said reflector comprises a mirror having a plurality of facets.

3. The step stare scanning device of claim 1 further comprising: signal detection means for receiving said signals reflected by said reflector.

4. The step stare scanning device of claim 3 wherein said signal detection means comprises an array of detector elements.

5. The step stare scanning device of claim 1 further comprising signal generation means for generating a scanning beam directed at said reflector.

6. The step stare scanning device of claim 5 wherein said signal generation means comprises a laser.

7. The step stare scanning device of claim 1 wherein the direction of angular rotation of said reflector is opposite the direction of angular rotation of said orbit.

8. The step stare scanning device of claim 1 wherein said reflector is rotated and orbited at substantially the same angular velocity.

9. The step stare scanning device of claim 1 wherein said moving means comprises:
   a housing;
   a motor mounted to said housing;
   a first shaft journaled in said housing and connected at a first end to said motor for rotary motion;
   an arm member fixed to a second end of said first shaft for rotary motion therewith;
   a second shaft journaled through said arm member and connected at a first end to said reflector for transmitting rotary motion thereto;
   a first pulley connected at a first end of the second shaft;
   a second pulley fixed to said housing; and
   a drive belt connecting said first pulley with said second pulley.

10. The step stare scanning device of claim 9 wherein said moving means further comprises mass means fixed to said arm member for mass balancing said moving means.

11. The step stare scanning device of claim 9 wherein said motor further comprises:
    a motor housing, said motor housing being journaled to said housing.

12. A step stare scanning device comprising:
    a mirror having a plurality of facets, each facet angled with respect to the other facets;
    signal detection means aligned with said mirror for receiving signals reflected from said facets; and
    moving means for causing said mirror to rotate about a first axis and substantially simultaneously orbit about a second axis so that signals received at said facets are reflected to said signal detection means.

13. The step stare scanning device of claim 12 wherein said signal detection means comprises an array of detector elements.

14. The step stare scanning device of claim 12 further comprising signal generation means for scanning in an active mode.

15. The step stare scanning device of claim 12, wherein said mirror is rotated and orbited in the same plane.

16. The step stare scanning device of claim 15, wherein said facets of said mirror are angled away from said plane.

17. A method of step stare scanning with a reflector having a plurality of reflecting surfaces, said reflecting surfaces being at different angles with respect to one another, said method comprising the steps of:
    orbiting said reflector about the center of a scanning pupil;
    rotating said reflector about its center while said reflector is being orbited;
    receiving signals at said reflecting surfaces; and
    reflecting said signals towards said scanning pupil 18. The method of claim 17 wherein the step of rotating further comprises rotating said reflector in an angular direction opposite that of said orbit.

19. The method of claim 17 wherein the step of rotating further comprises rotating and orbiting said reflector at the same angular velocity.

20. The method of claim 17 further comprising the step of:
    a) providing a detector at said scanning pupil;
    b) receiving said received and reflected signals at said detector; and
    c) producing an output in response to said signals received at said detector.

21. The method of claim 17 further comprising the steps of:
    a) providing a signal source at said scanning pupil; and b) directing a signal at said reflecting surfaces.

22. The method of claim 19 further comprising the steps of:
   a) providing a detector at said scanning pupil;
   b) receiving at said reflecting surfaces a portion of said signal reflected from a scanned target; and
   c) directing said reflected portion of said signal at said detector.

23. An active scanning device comprising:
   a scanning pupil having a pupil central axis;
   a reflector having a reflector central axis and a plurality of facets at different angles with respect to one another;
   means for rotating said reflector about said reflector central axis;
   means for revolving said reflector about said pupil central axis while said reflector is being rotated about said reflector central axis, said reflector being revolved and rotated in the same plane, wherein said facets are angled such that incoming signals are reflected from said reflector to said scanning pupil;
   detecting means for detecting said incoming signals that are reflected to said scanning pupil; and
   signal generation means for directing outgoing signals from said scanning pupil to said reflector.

* * * * *